Jan. 15, 1952  J. B. BARTOW  2,582,742
APPROACH SYSTEM FOR LANDING AIRCRAFT
Filed March 20, 1946  7 Sheets-Sheet 2
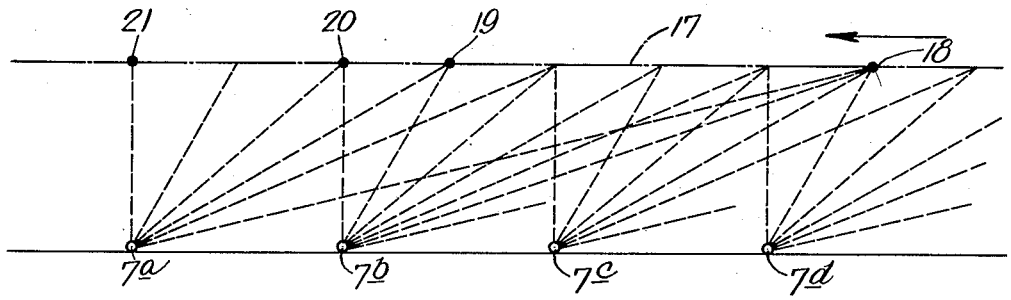
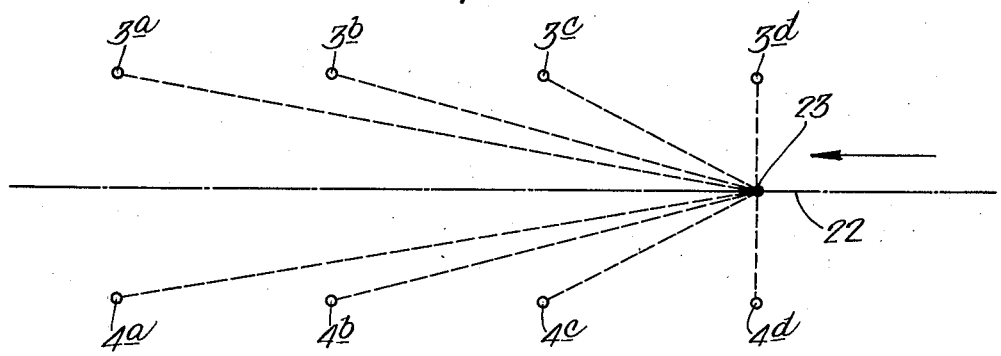
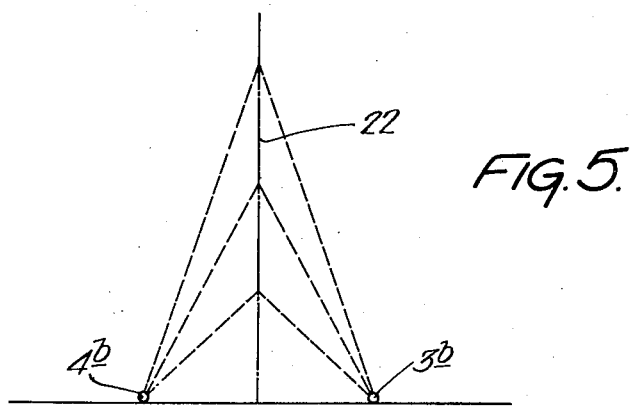
Inventor:
John B. Bartow
by his Attorneys
Howson &
Howson

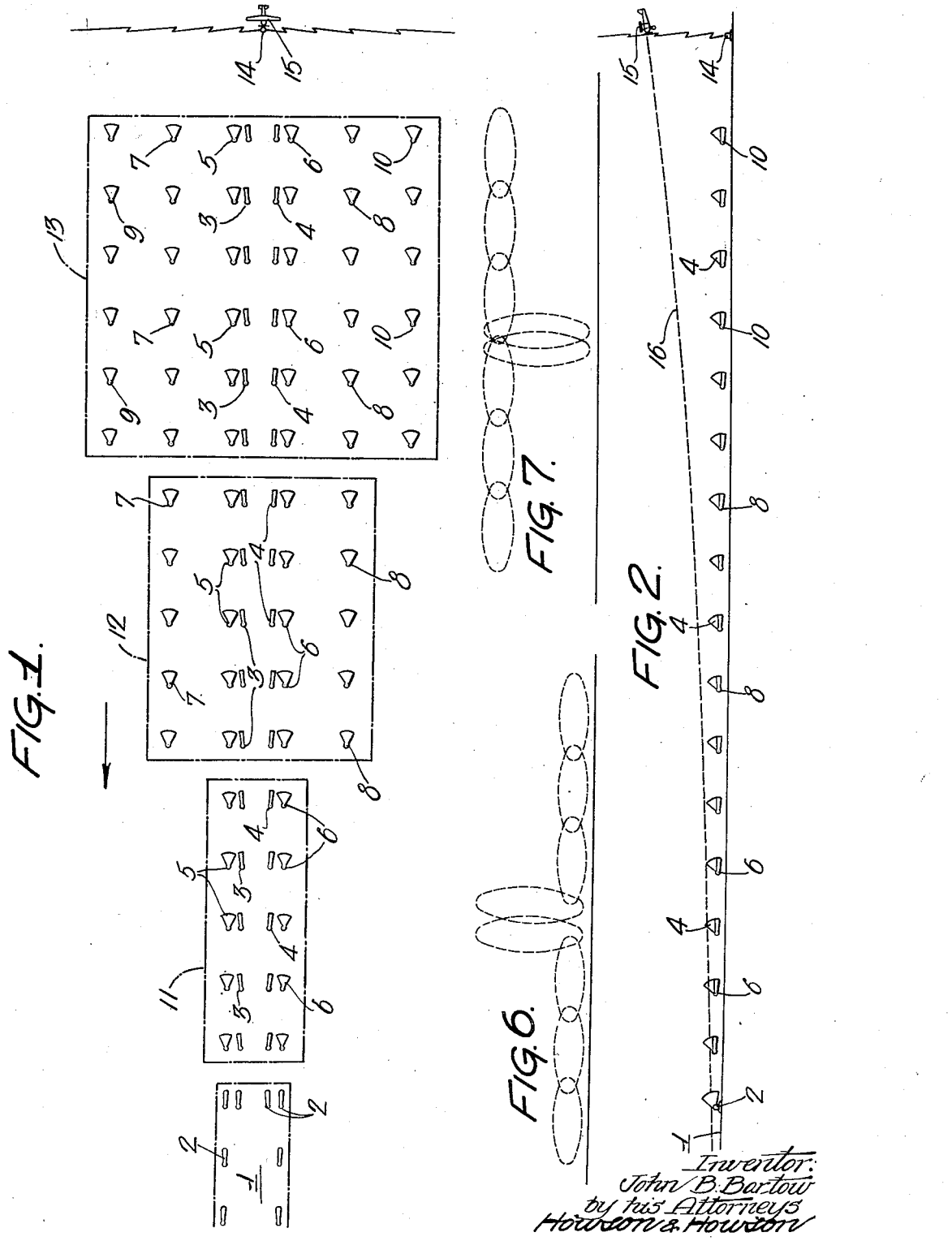

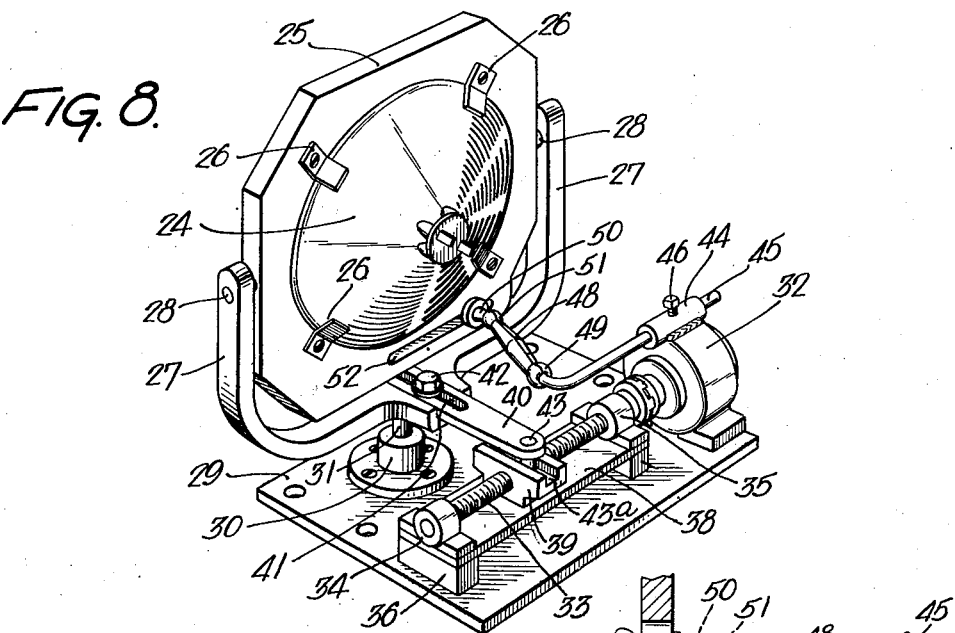

Jan. 15, 1952     J. B. BARTOW     2,582,742
APPROACH SYSTEM FOR LANDING AIRCRAFT
Filed March 20, 1946     7 Sheets-Sheet 4
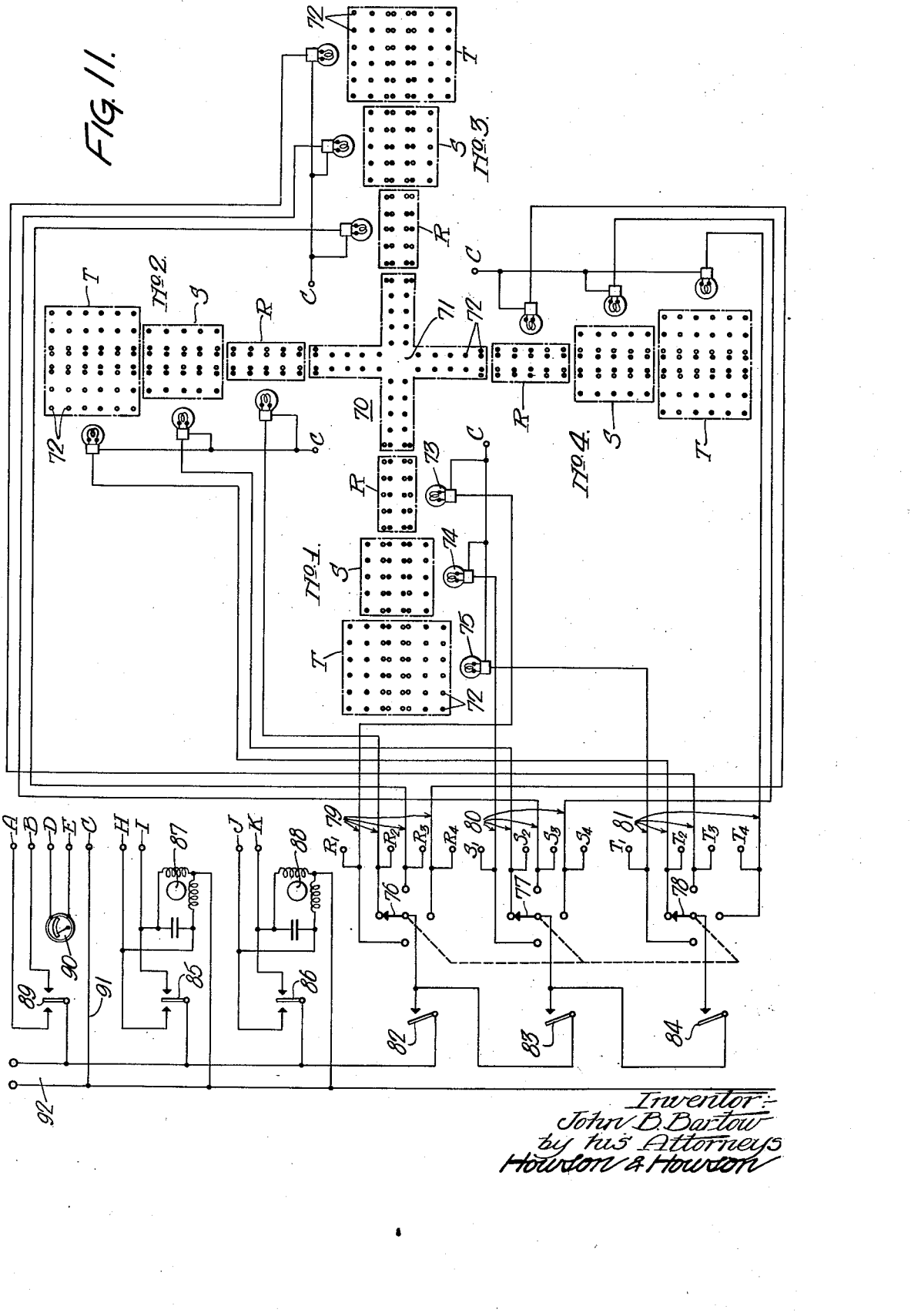

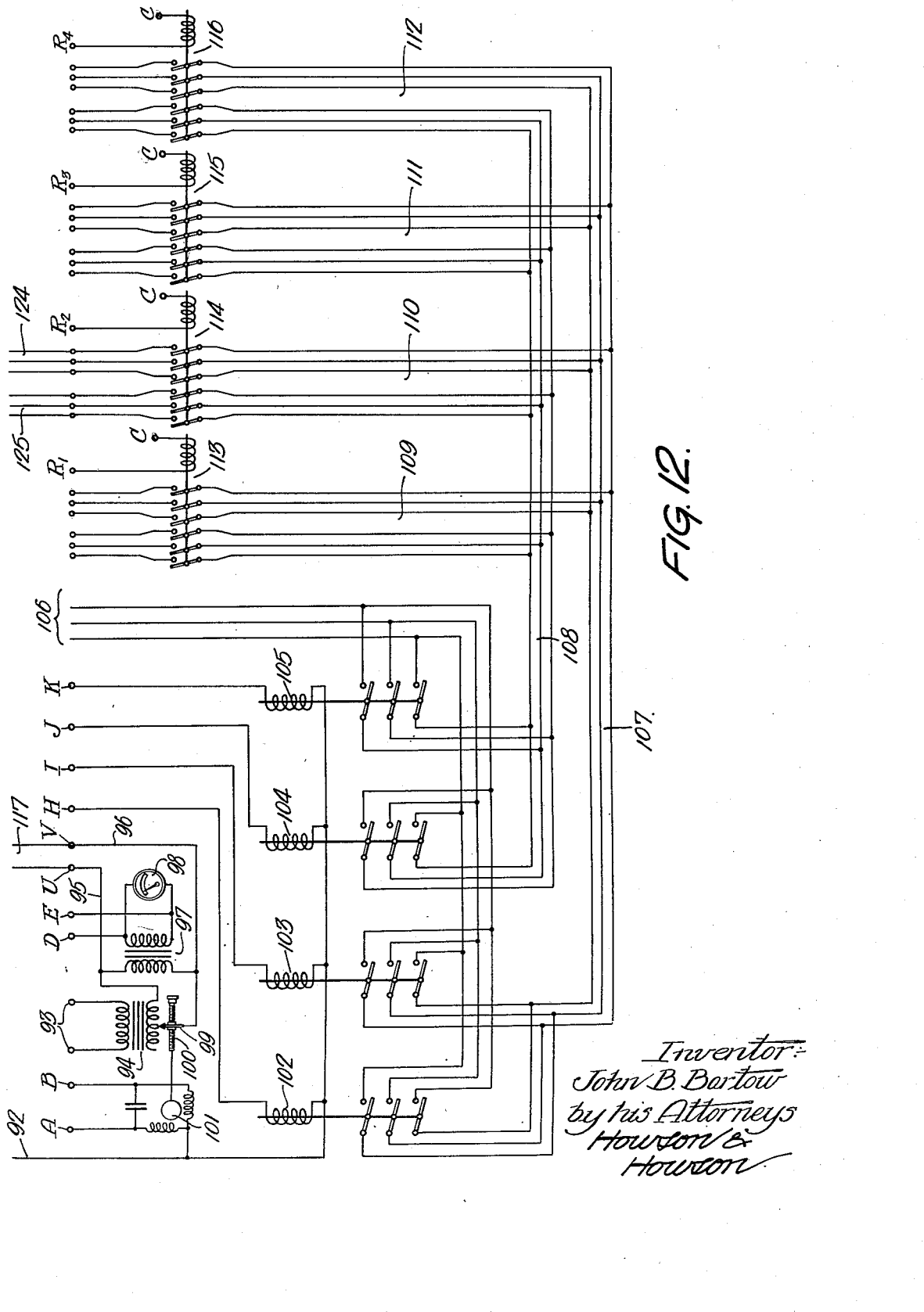

Jan. 15, 1952 J. B. BARTOW 2,582,742
APPROACH SYSTEM FOR LANDING AIRCRAFT
Filed March 20, 1946 7 Sheets-Sheet 7

Inventor:
John B. Bartow
by his Attorneys
Howson &
Howson

Patented Jan. 15, 1952

2,582,742

UNITED STATES PATENT OFFICE 2,582,742

APPROACH SYSTEM FOR LANDING AIRCRAFT

John B. Bartow, Blue Bell, Pa., assignor to Bartow Beacons, Inc., Philadelphia, Pa., a corporation of Pennsylvania Application March 20, 1946, Serial No. 655,702

24 Claims. (Cl. 177—352)

This invention relates to systems for enabling or facilitating the landing of aircraft under adverse weather or atmospheric conditions, and more particularly the invention relates to a novel approach system for guiding an aircraft pilot toward a landing runway during the existence of such conditions.

The principal object of the invention is to provide an improved system which will serve to guide the pilot along a proper approach path toward the landing runway, both as regard the direction of approach and the altitude of the aircraft at any instant during the approach.

Experience has shown that a pair of level parallel rows of light projectors at or near ground level may be used to enable an aircraft pilot to land the aircraft under adverse weather or atmospheric conditions, provided the projectors are properly spaced and have proper light distribution to avoid glare. Thus a pair of rows of light projectors along the opposite sides of a landing runway may be used to enable landing on the runway during adverse weather conditions, as disclosed and claimed in my prior Patent No. 2,155,295 granted April 18, 1939. If an aircraft pilot can see two properly arranged parallel rows of light sources without glare, he is able to direct the aircraft in the direction defined by such rows, and he is also able to judge the aircraft's attitude and altitude by virtue of the prospective viewing of the two rows of light sources. Therein lies the utility of two parallel rows of light sources as a means for enabling an aircraft pilot to land under adverse weather conditions. It should be noted further that it is not at all necessary for the aircraft pilot to see the rows of light sources in their entirety, as long as he sees parallel portions of the two rows at every instant during landing.

However, in order to thus utilize two rows of light sources defining the landing runway, it is necessary that the aircraft approach the runway in the proper direction and that the aircraft's attitude and altitude be approximately correct.

Ideally, the approach should be along a so-called glide path of gradually decreasing altitude toward the runway, so that when the piloted aircraft reaches the beginning of the runway, it is not only correctly headed but has the proper attitude and altitude for landing on the runway. The present invention is concerned with the provision of adequate means for properly guiding the aircraft pilot toward the landing runway, even under the worst atmospheric conditions.

Heretofore, instrument approach, including radio guidance by one or more radio beacons or markers, has been relied upon to guide the aircraft pilot toward the landing runway, but such devices alone are inadequate because they are inherently incapable of guiding the pilot to the runway with sufficient accuracy, especially when the prevailing weather conditions are very bad as when there are changing winds or gusts or during a snowstorm. Generally speaking, instruments are not suitable for use during landing approach below safe altitudes because the pilot is not able to follow instruments closely enough, especially in view of the fact that he is bound to be under tension or strain at the time. However, instruments are useful in guiding the pilot toward the approach area.

In accordance with the present invention, there is provided an approach system comprising controlled light sources which form an approach area including a corridor aligned with and leading to the landing runway, and which are adapted to lead the aircraft pilot into and along the approach corridor. The light sources forming the approach corridor are adapted to afford to the pilot observation of parallel rows of light sources, so that he is able to proceed along the approach corridor and is able to judge the altitude and attitude of the aircraft at any instant during the approach.

The present invention utilizes a principle which is described in my above-mentioned patent, i. e. that with proper spacing and light distribution a row of light sources may be made visible without glare to an aircraft pilot traversing a path in a plane parallel to the row of light sources. In this connection, reference may be had to Figs. 8, 9, 9A and 9B of my said prior patent and the description relative to those figures. In accordance with this invention, the said principle is utilized in a novel manner and is applied to rows of light sources forming an approach corridor and also to outer light sources arranged to lead an aircraft pilot into the said corridor. Furthermore, the light beams of the different light sources are so shaped and are so adjustable as to condition the system for different conditions of ceiling and ground visibility. Further still, the light beams are distinctively colored to apprise the pilot of his position laterally of the approach corridor.

The invention may be fully understood by reference to the accompanying drawings in which Fig. 1 is a schematic layout or plan view of an approach system according to the invention;

Fig. 2 is an elevational view of the same;

Figs. 3 to 7 are explanatory illustrations;

Fig. 8 is a perspective view of a light projector unit and the associated actuating mechanism;

Fig. 9 is sectional view of the complete projector;

Fig. 10 is detail view of the adjustable linkage employed;

Figs. 11 to 13 are diagrammatic illustrations of the electrical system employed.

Figure 13:
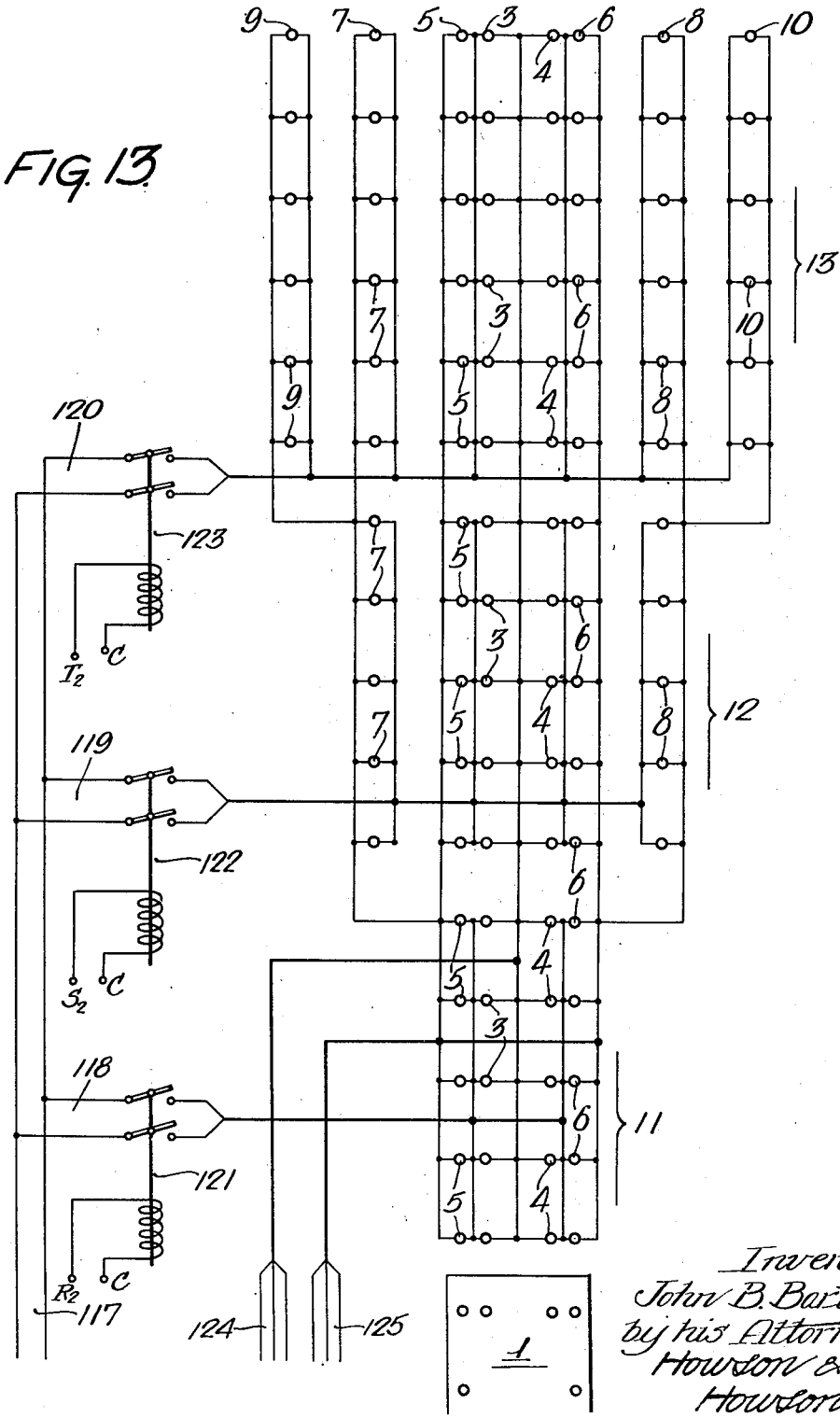

Referring first to Fig. 1, there is indicated at 1 the beginning of a landing runway having parallel rows of light projectors 2 on opposite sides thereof. The light projectors 2 may be designed and arranged in accordance with the teaching of my above-mentioned prior patent, in order that an aircraft pilot may see the two rows of light sources without glare as he approaches the runway during adverse weather conditions. As hereinbefore stated, the present invention is concerned with an approach system for properly guiding the aircraft pilot toward the runway 1.

In accordance with the present invention, there is provided an approach system comprising parallel rows of light projectors disposed substantially at ground level and having predetermined spacing, and light distribution, which projectors collectively form an approach area, as shown in Fig. 1. All of the light projectors are adapted to project light toward an approaching aircraft, the direction of approach being indicated by the symbolized aircraft. It will be noted that there are two central rows of light projectors 3 and 4 extending the full length of the approach area, which form an approach corridor aligned with and leading to the runway 1, along which corridor it is desired to guide an aircraft pilot. The term "approach corridor" is used with reference to the space above the ground area defined by the central rows of light projectors.

In addition to the two central rows of light projectors, there are outer rows of projectors designated 5, 6, 7, 8, 9 and 10, which are parallel with the inner rows and similarly spaced, so as to form transverse rows as well as longitudinal rows. The innermost ones of the outer rows are closely adjacent to the two central rows. The lateral spacing of the outer rows is predetermined according to the specific purposes of the invention as hereinafter set forth. In the specific illustration there are six outer rows of projectors, but any desired number of such rows may be employed.

The two central rows of light projectors are adapted to project vertically-spread light beams, while the outer center rows of light projectors are adapted to project horizontally-spread light beams. In other words, the light beams from projectors 3 and 4 are widened or spread out in the vertical sense, while the light beams from the other projectors are widened in the horizontal sense. These characteristics of the light beams are indicated symbolically in Figs. 1 and 2, the small circle in each instance representing the light-projector and the rest of the symbol representing the stated character of the light beam. The reason for these different beam characteristics will appear later. It should be noted that the symbols in Figs. 1 and 2 do not represent light distribution or transmission but are merely intended to indicate the widening of the different beams.

It will be noted further that while all of the rows of light projectors commence at the beginning of the approach area (at the right end side of Fig. 1), the outer rows are of progressively shorter length, so that the approach area defined by all of the light projectors is wide at the beginning and tapers toward the landing runway 1. Stated conversely, the approach area flares outwardly toward its beginning or starting end. This arrangement may be likened to the mouth and throat of a funnel or the like, and the underlying principle of the present invention is not unlike that of a funnel in that the object is to direct an approaching aircraft toward the approach corridor.

Preferably, the light projectors forming the entire approach area are divided lengthwise of said area into a plurality of banks or groups, as indicated by the dot-and-dash rectangles 11, 12 and 13, and the electrical connections supplying the light projectors are such that one or more of the banks may be cut out if weather conditions permit. While there are three banks shown in the specific illustration, the number may be varied according to the particular layout of the system.

In further accordance with the invention, the light beams projected by the various light projectors are distinctively colored to apprise the aircraft pilot of his position laterally with respect to the central approach corridor. Preferably, all of the projectors on one side of the corridor are adapted to project light of one color, e. g. green, while all of the projectors on the other side of the corridor are adapted to project light of a different color, e. g. yellow. The manner in which the distinctive coloring of the light beams helps to guide the pilot toward the central corridor will be clearly seen later.

In Figs. 1 and 2, a radio beacon or marker is represented at 14, the same being located near the beginning of the approach area so as to lead the aircraft pilot into the said area. While a single radio beacon is represented, a plurality thereof may be employed and may be arranged as desired.

Ideally, the approach of an aircraft such as represented by the symbol 15 in Figs. 1 and 2, should be along an imaginary glide path 16 (Fig. 2) within the centrally located approach corridor. However, as previously indicated, a radio beacon or marker will not suffice alone to guide an aircraft pilot into the approach corridor during bad weather conditions, but can only be relied upon to guide the pilot into the approach area at some point along the outer boundary thereof. There is no assurance that the pilot will enter the approach area centrally thereof, even though the radio beacon is centrally located as in Fig. 1. In other words, the pilot may enter the approach area at some point toward the outside thereof where the outer rows of light projectors are located. The purpose of the present invention is to guide the pilot into the approach corridor and along a proper glide path so that he will be in a correct position to land when he reaches the landing runway 1.

Referring to the previously-mentioned adjustment of the light beams, each of the light projectors in the two central rows 3 and 4 is rotatable about a vertical axis through a predetermined arc so as to move the beams of projectors inwardly or outwardly. All of the other light projectors are rotatable about a horizontal axis to move the beams thereof upwardly or downwardly, and these projectors are also rotatable about a vertical axis to move their beams horizontally. The purpose of these adjustments is to adapt the system for different weather or atmospheric conditions, and to guide the aircraft pilot under different conditions in the manner presently to be described. Examples of suitable means for adjusting the light projectors will be described hereinafter.

Generally speaking, during conditions of poor visibility, the horizontally-spread beams of the outer projectors are directed upwardly and are caused to overlap laterally of the approach area. At the same time, the vertically-spread beams of the central projectors are directed inwardly so as to make them clearly visible without glare to an aircraft pilot as he proceeds along the central approach corridor. The extent of adjustability of the light beams varies with conditions of visibility so as to insure adequate light transmission. With a given adjustment of the light beams during adverse weather conditions, an aircraft pilot entering the approach area on either side of the central approach corridor will come within the beams of some of the outer light projectors or light sources, and the color of the light will indicate to him that he is to the left or right of the central approach corridor. Hence he will direct the aircraft accordingly, and when he sees the two innermost rows of light sources each of different color, he will know that he is in the approach corridor. By reason of his continuous perspective viewing of two or more parallel and level rows of light sources he will be able correctly to judge his altitude and attitude as he proceeds to and then along the approach corridor. Thus he will be enabled to follow a proper glide path toward the landing runway.

The manner in which an aircraft pilot is thus guided into the central approach corridor and along a proper glide path therein may be more clearly seen with the aid of Figs. 3 to 5. Referring to Figs. 1 and 3, suppose that an aircraft pilot enters the approach area in the vicinity of the outer row of projectors 7. Fig. 3 is an elevational view in which there are represented several of these projectors which are designated 7a, 7b, 7c and 7d. The vertical light distribution of these projectors, and their spacing lengthwise of the approach area, are such that an approaching aircraft pilot will see at least several of these light sources with substantially equal intensity and without glare, according to the principle described in my previously-mentioned prior patent. Thus in Fig. 3, let us assume that an aircraft pilot is proceeding at some altitude or level represented by the dot-and-dash line 17. The broken lines emanating from the light sources represent portions of the projected light beams and indicate the light distribution in a vertical direction. Since the line or path of travel 17 is at an angle to the light beam from each projector, the variation in distance from the aircraft to the light source substantially balances the variation in beam candle power, giving substantially uniform intensity along the path of travel. Thus the candle power of that portion of the beam of source 7a projected to the point 18 is high, but the distance from the light source to that point is relatively great. The portions of the same beam projected to points 19, 20 and 21 are of lesser and decreasing candle power, but the distances from the light source to these points get progressively shorter. The result is that the light intensity at points 18 to 21 is substantially uniform. This eliminates any glaring or blinding effect which would be caused by non-uniformity of the light intensities at successive points along the path of travel.

It should be noted that the intensity of light received from any of the light sources at any point is determined by Allard's law, $$I = \frac{E_0 D^2}{T_d}$$

where I is candle power at the source, $E_0$ is the candle power at the point of reception, D is the unit of distance, T is the percentage of the candle power transmitted for a given distance of atmosphere, and $d$ is the number of units of T.

It should be noted also that the beams of adjacent light projectors cross one another or overlap. The high candle power portion of each beam projects into the low candle power portions of the immediately preceding beams. Therefore, at any point along the approach path 17, the aircraft pilot will see at least several of the light sources. For example, at point 18 he will see all four of the represented light sources which will appear with substantial equal intensity and without glare. A fuller explanation of the principle involved is set forth in my above-mentioned prior patent to which reference may be had, if desired.

The purpose of shifting the light beams of Fig. 3 upwardly or downwardly, according to weather conditions and cloud ceilings, is to position the most effective portion of each beam to best advantage from the standpoint of the approaching pilot. Thus when ceiling conditions are not very bad, the beams may be lowered so that they will become more effective at greater range, as the lower candle power portions of the beams will be adequate at closer range to guide the pilot. During low ceiling conditions, the beams may be raised so that the high candle power portions thereof will be effective. In this connection, it should be borne in mind that the light transmission or penetration varies according to atmospheric conditions, and this is the reason for raising and lowering the light beams. It should be noted also that this shifting of the light beams avoids excessive brightness which might cause glare.

As previously mentioned, the horizontally-spread beams of the outer projectors are also shifted horizontally according to weather conditions. During low ceiling conditions, the visible range of these light sources is considerably shortened. Therefore, when their beams are raised they are simultaneously moved inwardly so they overlap within the visible range. This insures that an aircraft pilot will come within the beam spread of at least two rows of light projectors regardless of his lateral position of approach along the outer portions of the approach area. Consequently the pilot will be able to see at least two rows of light sources of distinctive color, which will indicate whether he is to the right or left of the central approach corridor. Thus the projectors of horizontally-spread light beams effectively guide the aircraft pilot into the approach corridor, giving him a true perspective to guide him.

Fig. 4 is a plan view in which there are represented several projectors of the central rows 3 and 4 of Fig. 1. Thus in Fig. 4 there are four projectors designated 3a, 3b, 3c and 3d, and there are four projectors designated 4a, 4b, 4c and 4d. The central vertical plane of approach in the direction of the arrow is represented by the dot-and-dash line 22. The broken lines represent light from the several sources to some point 23 in plane 22. Fig. 5 is a transverse elevational view wherein sources 3b and 4b are shown. In accordance with the principal of the aforementioned prior patent, the light distribution of the two rows of projectors is such that a plurality of these light sources are visible to the pilot with substantially equal intensity at any point in the vertical plane 22. Thus, when the pilot has entered the approach corridor, he is enabled to travel along a proper descending path toward the runway, due to his perspective viewing of the corridor-forming light sources without glare.

The reason for shifting the beams of these projectors inwardly and outwardly according to weather conditions, as hereinbefore mentioned, is the same as described in connection with the raising and lowering of the outer beams, i. e. to position the high and low candle power portions of the beams to best advantage. Thus when the weather conditions are not very bad and with good light transmission, the central beams are shifted outwardly making them visible from longer range, since the low candle power portions of the beams are sufficient at close range to make the light sources visible without glare to guide the pilot along the approach corridor. However, when weather conditions are very bad with low light transmission, the said beams are shifted inwardly so that the high candle power portions thereof will be effective to make the light sources visible without glare to guide the pilot along the approach corridor.

As previously pointed out, since the pilot is able to see portions of the two central rows of light projectors, as he traverses the approach corridor, he is able to judge the aircraft's altitude and attitude and is thus able to move along a proper approach path until he reaches the landing runway.

The shifting of the different light beams is effected according to the ceiling and ground visibility at any particular time, and also according to the time, i. e. day or night. Since the outer light beams serve to guide the aircraft pilot into the approach corridor while he is at a safe altitude, the shifting of these light beams is effected according to the existing ceiling. On the other hand, since the central beams forming the approach corridor serve to guide the aircraft pilot during a downward glide preparatory to landing, the shifting of these light beams is effected according to the existing ground visibility. By "ground visibility" is meant the visibility, or transmission of the atmosphere, under the cloud base which is referred to as the "ceiling."

When the ceiling is low or zero, the horizontally-spread light beams are raised to or near their maximum inclination to the ground and are moved inwardly toward the approach corridor. When the ceiling is relatively high, these beams are lowered and are moved outwardly.

When the ground visibility is poor, the centrally located vertically-spread beams are directed inwardly, and when the ground visibility is relatively good, these beams are moved outwardly.

Figs. 6 and 7 represent beam adjustments of a transverse row of light projectors for extreme conditions of ceiling and ground visibility. Fig. 6 represents the beam positions for high ceiling and good ground visibility, while Fig. 7 represents the beam positions for low ceiling and poor ground visibility. Since the corridor-forming projectors and the outer projectors are adjustable independently, as hereinafter described, they can be adjusted for any conditions, such as low ceiling with good ground visibility or high ceiling with poor ground visibility.

Referring now to Figs. 8 to 10, there is illustrated one form of a mechanism which may be employed to adjust the light projectors in accordance with the foregoing description. The same type of mechanism may be employed to actuate the innermost and outer projectors, as the mechanism is adjustable to provide the different adjustments of the horizontally-spread and vertically-spread light beams. Therefore it is only necessary to illustrate a single mechanism, it being understood that the same type of mechanism is employed for each of the light projectors in the entire system.

As shown in Figs. 8 and 9, the light projecting unit 24 is removably mounted on a support 25 by means of suitable clasps 26. The support 25 is pivotally carried by a yoke 27 for movement about a horizontal axis. To this end the arms of yoke 27 extend vertically adjacent the support 25, and the yoke carries horizontal pivot pins 28 upon which the support 25 is mounted. The yoke 27, in turn, is mounted for rotation about a central vertical axis. A horizontal supporting panel or plate 29 carries a bearing support 30, and the yoke 27 has a centrally located depending rod or shaft 31 which seats in the bearing support 30.

A reversible motor 32 is also mounted on the supporting panel 29, and its armature or rotor is mechanically coupled to a screw shaft 33 which is rotatably supported by bearings 34 and 35 mounted on supporting blocks 36 and 37. The latter also support a plate 38 which extends below the screw shaft 33 in parallel relation therewith. A nut 39 threadedly engages the screw shaft and is supported thereby. It will be noted that the nut slides along the plate 38 as the screw shaft rotates. An arm 40 extends between yoke 27 and nut 39. One end of arm 40 is slotted at 41 and seats in a central recess of yoke 27, being held by screw 42. The other end of arm 40 carries a pin 43 which rides in a recess 43a of nut 39. It will be obvious that the light projector unit 24 may be caused to rotate in either direction about its central vertical axis of rotation by operating the reversible motor 32 in either direction, and the rate of movement may be varied by means of the adjustability afforded by slot 41 and screw 42. Such adjustability enables different rates of movement of the inner and outer projectors, and it also enables different rates of movement of the rows of outer projectors. Thus, it may be desired to have the outermost rows of projectors move faster than the other projectors.

To effect rotation of the light projector unit 24 about its horizontal axis of rotation there is provided a linkage device now to be described. A sleeve 44, mounted on top of motor 32, adjustably carries a rod 45 which extends above the screw shaft 33 and parallel therewith. A set screw 46 enables longitudinal adjustment of the rod 45. This rod is bent laterally at its end 47 and is connected to a link 48 by means of a universal or ball joint 49. The opposite end of link 48 is connected to a stud 50 by means of a second universal or ball joint 51. The stud 50 is adjustably supported within a slot 52 in the lower part of support 25. To this end, the stud 50 has an integral shank 53 which is threaded at its end to receive a wing nut 54.

It will be noted that the slot 52 is so located and is of such length that the stud 50 may be centrally positioned in alignment with the vertical rotational axis of the light projector unit 24, or it may be adjusted to some point off center. When the stud is centrally positioned, the linkage has no effect on the light projector unit 24 and the latter simply rotates about its vertical axis as the screw shaft 33 rotates. However, when stud 50 is adjusted to a position other than its central position, the linkage causes the light projector unit 24 to rotate about its horizontal axis at the same time that it rotates about its vertical axis. By virtue of the adjustability of rod 45 and stud 50, it is possible to effect different amounts of rotation of unit 24 about its horizontal axis for a given amount of rotation of the unit about its vertical axis.

As stated above, each of the light-projecting devices employed in the approach system provided by the present invention may be of the form illustrated in Figs. 8 to 10. Each device of the two innermost rows shown in Fig. 1 may have the stud 50 adjusted to the central position so that the light projectors will move only in the horizontal sense to move the vertically-spread beams inwardly and outwardly, as above described. The outer devices, however, will have the stud 50 adjusted to an offset position so that these projectors will be moved in both the vertical and horizontal sense to move the horizontally-spread beams in the manner above described. Obviously, the utilization of a single form of mechanism which is adaptable for the inner and outer light projectors is highly desirable from the standpoint of simplicity and uniformity. It should be noted that the removability of the light projector unit 24 enables the insertion of different types of units adapted respectively to project horizontally and vertically spread light beams. Of course, the character of the beam and the light distribution are dependent on the lens of the unit.

Each light projector and its associated operating mechanism may be encased in a moisture-proof transparent housing, as shown in Fig. 9. The housing may comprise a base 55 and a transparent dome 56. The base 55 may be shaped as illustrated and may be provided with lugs 57 to seat the supporting panel 29. A seal may be effected between the dome and the base by means of a resilient sealing ring 58. The dome may be held in place by means of suitable latch devices, one of which is shown at 59. The entire unit may be placed on the ground, which is represented at 60, or it may be mounted on a support, such as a post, so as to be above the ground.

To provide the desired coloring of the light beams, as hereinbefore mentioned, a color screen may be provided in each projector. Preferably a dome-shaped color screen 61 is provided, having two half sections 62 and 63, one adapted to provide green or yellow and the other adapted to provide red. If it is desired to prevent landing of aircraft on a particular runway, the color screens of the various projectors may be rotated through 180° to produce all red light beams. To this end, each projector is provided with a motor 64, and all of the motors may be actuated simultaneously. The color screen 61 is carried by a ring 65 which rests on rollers 66 carried by base member 55. Ring 65 has gear teeth formed thereon which mesh with a pinion 68 driven by the motor 64. The latter is mounted on a bracket 69 secured to base 55.

For simplicity of illustration, the supply conductors for the lamp and motors are not shown in Fig. 9. Such conductors may be brought into the housing at the bottom thereof.

In Figs. 11 to 13, there is diagrammatically illustrated an electrical system or arrangement which may be employed. Fig. 11 illustrates certain apparatus which may be located in a control tower. Fig. 12 illustrates other apparatus which may be located in a control vault. Fig. 13 illustrates diagrammatically the electrical connections to the light projecting devices of an approach system. In considering these illustrations, it is to be understood that the correspondingly designated terminals are intended to be connected together.

A complete aircraft landing field might comprise four runways extending radially from a common juncture at right angles to one another. In the control tower there may be provided a miniature replica of the complete landing field, as represented at 70 in Fig. 11. At the central portion 71 of this replica the four runways are shown and each has an associated approach system. The four sections of the simulated landing fields are designated No. 1, No. 2, No. 3 and No. 4. Each of the four approach systems has three sections corresponding to those in Fig. 1 and designated by the letters R, S and T.

The replica 70 serves as an indicating means to indicate the light projectors in operation at any particular time. To this end, the replica 70 may be in the form of an opaque board or chart having openings or transparent areas representing the various light projectors, as indicated by the dots 72. Suitable lamps may be disposed behind the various sections of the chart to indicate operation of a particular group of light projectors. In the illustration, lamps 73, 74 and 75 are represented in association with the respective sections R, S and T of each approach system. Of course it will be understood that more than one lamp may be associated with each section. If necessary, suitable light shields or barriers may be employed to confine the light of each lamp to its particular section.

The indicating lamps are controlled by selector switches 76, 77 and 78 each of which has four positions. Switch 76 controls lamps 73 over conductors 79; switch 77 controls lamps 74 over conductors 80; and switch 78 controls lamps 75 over conductors 81. The three switches are preferably ganged for operation by a single control. By means of these switches, any one of the four runways and its associated approach system may be selected, and a corresponding indication will be given on the replica chart 70. To this end, the stationary contacts of the said switches are connected to certain apparatus in the control vault and in the field by way of terminals designated by the letters R, S and T with numeral subscripts. The connections will be described later.

In addition to the above-mentioned switches, there are provided control switches 82, 83 and 84, by means of which the three sections R, S and T of each approach system may be controlled. It will be noted that the switches 82, 83 and 84 are connected so that when all three of them are closed, all of the light projectors of an approach system are energized. When switch 84 is opened, the projectors of the outer section T are de-energized. Similarly, the switch 83 controls the intermediate section S, and the switch 82 controls the inner section R and serves as a master switch.

The movement of the light beams of the projectors of the approach system, as hereinbefore described, is effected by means of switches 85 and 86, which are connected to certain apparatus in the control vault by way of terminals H, I and J, K. Switch 85 controls the movement of the vertically-spread beams, while switch 86 controls the movement of the horizontally-spread beams. These switches also control motor-operated indicators whose actuating motors are represented at 87 and 88.

Provision is also made for controlling the brightness or light intensity of the operating light projectors, according to atmospheric conditions. A switch 89 serves to increase or decrease the brightness, this switch being connected to apparatus in the control vault by way of terminals A and B. A brightness indicator 90 is also connected to the apparatus in the control vault by way of terminals D and E.

A common return conductor 91 is connected to one side of the supply line 92, and the various indicator lamp circuits and other connections are completed by way of this conductor, as indicated by the terminal designation C.

Referring now to Fig. 12, the light projectors of the approach system are energized from a suitable source connected to terminals 93 and an associated transformer 94. The desired voltage is derived by way of conductors 95 and 96 which are connected to the various light projectors by way of terminals U and V. A second transformer 97 supplies a suitable voltage to the brightness indicators 90 and 98. The brightness or light intensity is controlled by means of a variable tap 99 on the secondary winding of transformer 94, which tap is actuated by a screw shaft 100 driven by a reversible motor 101. It will be noted that motor 101 may be operated in either direction by means of switch 89 shown in Fig. 11.

Switches 85 and 86, previously mentioned, control the energization of relays 102, 103, 104 and 105. A three-phase supply line 106 is preferably employed to energize the motors associated with the various light projectors for moving the light beams as previously described. The motors may be single phase motors of modern design. The relays 102 to 105 effect reverse operation of the beam-shifting motors, under control of switches 85 and 86, by interchanging the connections of the three-phase supply line. The relays 102 and 103, which are controlled by switch 85, control the supply of current via conductors 107 to the motors associated with the corridor-forming light projectors whose beams are vertically spread, while relays 104 and 105, which are controlled by switch 86, control the supply of current via conductors 108 to the outer light projectors whose beams are horizontally spread.

Extending from conductors 107 and 108 are four groups of conductors 109, 110, 111 and 112 which are connected to the beam-shifting motors of the four approach systems. The relays 113, 114, 115 and 116 select any desired one of the said conductor groups according to the position of switch 76. All of the motors of the selected approach system are operable by switches 85 and 86 as long as switch 82 is closed, regardless of whether the projector lamps are energized.

Referring now to Fig. 13, there is shown a single approach system and its associated runway corresponding to the system shown in Fig. 1. As in Fig. 1, the runway is designated 1, while the several sections of the approach system are designated 11, 12 and 13 respectively. The lighting current for all of the light projectors of the approach system shown is supplied by way of conductors 117. The branch circuits 118, 119 and 120 leading to the different sections of the approach system are controlled by relays 121, 122 and 123. These relays are controlled by means of the switches 82, 83 and 84, respectively, of Fig. 11. Assuming that the approach system shown in Fig. 13 is that designated No. 2 in Fig. 11, the windings of relays 121, 122 and 123 will be connected to the terminals R₂, S₂ and T₂ in Fig. 11.

In Fig. 13, there are two three-conductor cables 124 and 125, the conductors of which are connected to conductors 110 of Fig. 12. Cable 124 supplies current from conductors 107 (Fig. 12) to the beam-shifting motors of the corridor-forming projectors of the approach system shown in Fig. 13. Cable 125 supplies current from conductors 108 to the beam-shifting motors of the outer projectors of the approach system shown in Fig. 13.

For simplicity of illustration, the electrical connections to the various projectors in Fig. 13 are represented by single lines.

The other three approach systems (not shown) may be similar to that of Fig. 13, the motor-supply conductors being connected to the conductor groups 109, 111 and 112 of Fig. 12.

Since the color-changing arrangement previously described is optional the electrical connections for supplying the color-changing motors have not been shown in Figs. 11 to 13. It suffices to state that such motors, if employed, may be supplied and controlled in the same way that the beam-shifting motors are supplied and controlled. In such case, provision may be made to indicate in the control tower the color of the projected light. Thus the indicator board may have red lights which are energized when the projectors are caused to emit red light.

Figure 14:
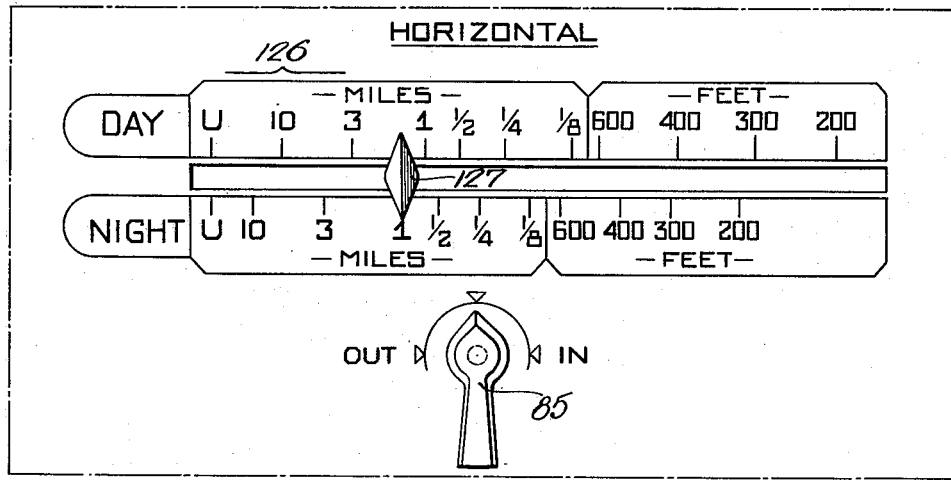
Figs. 14 and 15 illustrate the beam-adjustment indicators.
Figure 15:
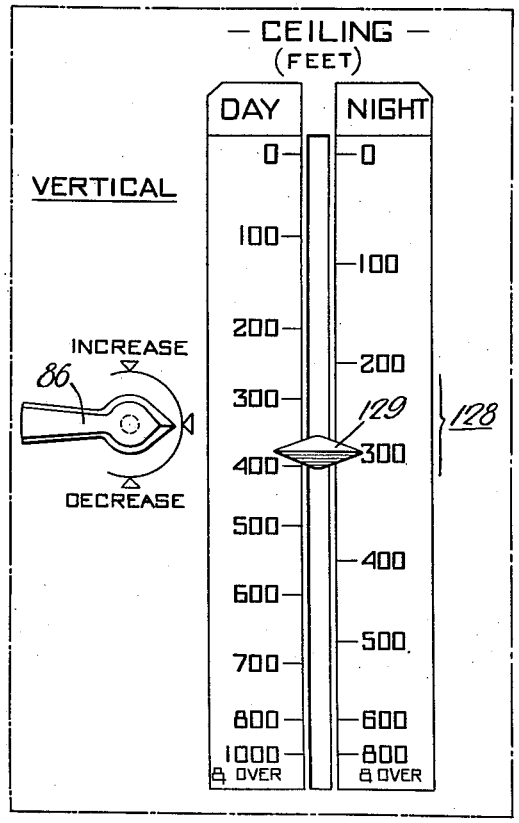

The horizontal and vertical adjustment indicators, previously mentioned, may take the form shown in Figs. 14 and 15. The horizontal indicator, which shows adjustment of the vertically-spread beams, may comprise a calibrated and marked dial 126 and a motor-driven pointer 127; and similarly the vertical indicator, which shows adjustment of the horizontally-spread beams, may comprise a calibrated and marked dial 128 and a motor-driven-pointer 129. The dial 126 (Fig. 14) may have two scales indicating day and night ground visibilities in feet and miles, while the dial 128 may have two scales indicating ceiling in feet. The switches 85 and 86 may be associated with the indicators as illustrated.

While the invention has been described with reference to the embodiment illustrated, it will be understood that various modifications are possible and the invention is not limited to the particular embodiment shown and described.

I claim:

1. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project horizontally narrow and vertically wide light beams, and other rows of light projectors parallel to the corridor-forming rows on the opposite sides of the corridor and forming therewith an approach area, said other projectors being adapted to project vertically narrow and horizontally wide light beams.

2. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project horizontally narrow and vertically wide light beams, other rows of light projectors parallel to the corridor-forming rows on the opposite sides of the corridor and forming therewith an approach area, said other projectors being adapted to project vertically narrow and horizontally wide light beams, and means for moving the various light projectors so as to shift the light beams according to different weather conditions.

3. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project vertically-spread light beams, other rows of light projectors parallel to the corridor-forming rows on the opposite sides of the corridor and forming therewith an approach area, said other projectors being adapted to project horizontally-spread light beams, and means for moving the various light projectors so as to shift said vertically-spread light beams horizontally and to shift said horizontally-spread light beams both vertically and horizontally, whereby to adapt the system to different weather conditions.

4. An approach system for guiding an aircraft pilot toward a landing runaway during landing of the aircraft especially under adverse weather conditions, comprising a plurality of rows of light projectors arranged to form an approach corridor aligned with and leading to said runaway, said projectors being adapted to project vertically-spread light beams, other rows of light projectors parallel to the corridor-forming rows on the opposite sides of the corridor and forming therewith an approach area, said other projectors being adapted to project horizontally-spread light beams, the approach area comprising a plurality of sections longitudinally, means for selectively energizing the lamps of the light projectors according to said sections, each of the light projectors including a motor and mechanism for shifting the light beams according to different weather conditions, the vertically-spread light beams of the corridor-forming projectors being shiftable horizontally and the horizontally-spread light beams of the other projectors being shiftable both vertically and horizontally, means operable at will to energize the motors of the corridor-forming projectors, and other means operable at will to energize the motors of the other projectors.

5. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project vertically-spread light beams, and having such spacing and such light distribution that a plurality of the projectors of each row are visible with substantially equal intensity from any point in a vertical plane midway between said rows, and outer rows of light projectors parallel to the corridor-forming rows on the opposite sides of the corridor and adapted to lead the pilot into said corridor, said outer projectors being adapted to project horizontally-spread light beams which overlap to form an approach area, the light projectors of each outer row having such spacing and such vertical distribution of light that a plurality of said projectors are visible to a pilot approaching at a certain altitude with substantially equal intensity.

6. An approach system as defined in claim 5, wherein the projectors are adapted to give a color indication of the pilot's position with respect to the approach corridor.

7. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project vertically-spread light beams, and having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors being adapted to project horizontally-spread light beams which overlap to form an approach area, the light projectors of each outer row having such spacing and such vertical distribution of light that a plurality of said projectors are visible to a pilot approaching at a certain altitude with substantially equal intensity, means for adjusting said corridor-forming projectors to adjust their beams according to ground visibility, and means for adjusting said outer projectors to adjust their beams according to ceiling.

8. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project horizontally narrow and vertically wide light beams, other rows of light projectors parallel to the corridor-forming rows on the opposite sides of the corridor and forming therewith an approach area, said other projectors being adapted to project vertically narrow and horizontally wide light beams, the approach area comprising a plurality of sections longitudinally, and means for selectively energizing the lamps of the light projectors according to said sections.

9. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project vertically-spread light beams, other rows of light projectors parallel to the corridor-forming rows on the opposite sides of the corridor and forming therewith an approach area, said other projectors being adapted to project horizontally-spread light beams, each of the light projectors including a motor and mechanism for shifting the light beams according to different weather conditions, the vertically-spread light beams of the corridor-forming projectors being shiftable horizontally and the horizontally-spread light beams of the other projectors being shiftable both vertically and horizontally, means operable at will to energize the motors of the corridor-forming projectors, and other means operable at will to energize the motors of the other projectors.

10. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project horizontally narrow and vertically wide light beams, outer rows of light projectors parallel to the corridor-forming rows on the opposite sides of the corridor and adapted to lead the pilot into said corridor, said outer projectors being adapted to project vertically narrow and horizontally wide light beams which overlap to form an approach area, means for positionally adjusting said corridor-forming projectors to shift their beams according to ground visibility, and means for positionally adjusting said outer projectors to shift their beams according to ceiling.

11. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project horizontally narrow and vertically wide light beams, other rows of light projectors parallel to the corridor-forming rows on the opposite sides of the corridor and forming therewith an approach area, said other projectors being adapted to project vertically narrow and horizontally wide light beams, and means for controlling the intensity of the light beams according to different weather conditions.

12. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project horizontally narrow and vertically wide light beams, other rows of light projectors parallel to the corridor-forming rows on the opposite sides of the corridor and forming therewith an approach area, said other projectors being adapted to project vertically narrow and horizontally wide light beams, means for moving the various light projectors so as to shift their light beams according to different weather conditions, and means for controlling the intensity of the light beams according to said conditions.

13. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project vertically-spread light beams, and having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors being adapted to project horizontally-spread light beams which overlap to form an approach area, the light projectors of each outer row having such spacing and such vertical distribution of light that a plurality of said projectors are visible to a pilot approaching at a certain altitude with substantially equal intensity, and means for moving the various light projectors so as to shift said vertically-spread light beams horizontally and to shift said horizontally-spread light beams both vertically and horizontally, whereby to adapt the system to different weather conditions.

14. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project vertically-spread light beams, and having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors being adapted to project horizontally-spread light beams which overlap to form an approach area, the light projectors of each outer row having such spacing and such vertical distribution of light that a plurality of said projectors are visible to a pilot approaching at a certain altitude with substantially equal intensity, each of the light projectors including a motor and mechanism for shifting the light beams according to different weather conditions, the vertically-spread light beams of the corridor-forming projectors being shiftable horizontally and the horizontally-spread light beams of the outer projectors being shiftable both vertically and horizontally, means operable at will to energize the motors of the corridor-forming projectors, and other means oerable at will to energize the motors of the outer projectors.

15. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project vertically-spread light beams, and having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors being adapted to project horizontally-spread light beams which overlap to form an approach area, the light projectors of each outer row having such spacing and such vertical distribution of light that a plurality of said projectors are visible to a pilot approaching at a certain altitude with substantially equal intensity, all of the aforementioned light projectors being divided into a plurality of successive groups longitudinally of the approach system, and means for selectively energizing the lamps of the light projectors according to said groups.

16. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project vertically-spread light beams, and having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors being adapted to project horizontally-spread light beams which overlap to form an approach area, the light projectors of each outer row having such spacing and such vertical distribution of light that a plurality of said projectors are visible to a pilot approaching at a certain altitude with substantially equal intensity, said outer projectors being arranged to provide a plurality of successive groups longitudinally of the approach system, the successive groups decreasing in width toward said runway, and means for selectively energizing the lamps of the light projectors according to said groups.

17. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project vertically-spread light beams, and having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors being adapted to project horizontally-spread light beams which overlap to form an approach area, the light projectors of each outer row having such spacing and such vertical distribution of light that a plurality of said projectors are visible to a pilot approaching at a certain altitude with substantially equal intensity, all of the aforementioned light projectors being divided into a plurality of successive groups longitudinally of the approach system, means for selectively energizing the lamps of the light projectors according to said groups, and means for moving the various light projectors so as to shift the light beams according to different weather conditions.

18. An approach system for guiding an aircraft pilot toward a landing runway during landing of the aircraft especially under adverse weather conditions, comprising a pair of rows of light projectors arranged to form an approach corridor aligned with and leading to said runway, said projectors being adapted to project vertically-spread light beams, and having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors being adapted to project horizontally-spread light beams which overlap to form an approach area, the light projectors of each outer row having such spacing and such vertical distribution of light that a plurality of said projectors are visible to a pilot approaching at a certain altitude with substantially equal intensity, all of the aforementioned light projectors being divided into a plurality of successive groups longitudinally of the approach system, means for selectively energizing the lamps of the light projectors according to said groups, and means for moving the various light projectors so as to shift the light beams according to different weather conditions.

19. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project vertically-spread light beams, other rows of light projectors parallel to the corridor-forming rows on the opposite sides of the corridor and forming therewith an approach area, said other projectors being adapted to project horizontally-spread light beams, all of the aforementioned light projectors being divided into a plurality of successive groups longitudinally of the approach system, means for selectively energizing the lamps of the light projectors according to said groups, and means for moving the various light projectors so as to shift said vertically-spread light beams horizontally and to shift said horizontally-spread light beams both vertically and horizontally, whereby to adapt the system to different weather conditions.

20. An approach system for guiding an aircraft pilot toward a landing runway during landing of the aircraft especially under adverse weather conditions, comprising a plurality of rows of light projectors arranged to form an approach corridor aligned with and leading to said runway, said projectors being adapted to project vertically-spread light beams, other rows of light projectors parallel to the corridor-forming rows on the opposite sides of the corridor and forming therewith an approach area, said other projectors being adapted to project horizontally-spread light beams, and being arranged to provide a plurality of successive groups longitudinally of the approach system, the successive groups decreasing in width toward said runway, means for selectively energizing the lamps of the light projectors according to said groups, and means for moving the various light projectors so as to shift said vertically-spread light beams horizontally and to shift said horizontally-spread light beams both vertically and horizontally, whereby to adapt the system to different weather conditions.

21. An approach system for guiding an aircraft pilot toward a landing runway during landing of the aircraft especially under adverse weather conditions, comprising a plurality of rows of light projectors arranged to form an approach corridor aligned with and leading to said runway, other rows of light projectors parallel to the corridor-forming rows on the opposite sides of the corridor and forming therewith an approach area, and means for moving the various light projectors so as to shift the light beams of the corridor-forming projectors horizontally and to shift the light beams of the approach-forming projectors both vertically and horizontally, whereby to adapt the system to different weather conditions.

22. An approach system for guiding an aircraft pilot toward a landing runway during landing of the aircraft especially under adverse weather conditions, comprising a pair of rows of light projectors arranged to form an approach corridor aligned with and leading to said runway, said projectors having such spacing and such light distribution that a plurality of projectors of each row are visible with substantially equal intensity from any point in a vertical plane midway between said rows, and outer rows of light projectors parallel to the corridor-forming rows on the opposite sides of the corridor and adapted to lead the pilot into said corridor, said outer projectors having such spacing and such vertical distribution of light that a plurality of said projectors are visible to a pilot approaching at a certain altitude with substantially equal intensity.

23. An approach system for guiding an aircraft pilot toward a landing runway during landing of the aircraft especially under adverse weather conditions, comprising a pair of rows of light projectors arranged to form an approach corridor aligned with and leading to said runway, said projectors having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors having such spacing and such vertical distribution of light that a plurality of said projectors are visible to a pilot approaching at a certain altitude with substantially equal intensity, means for adjusting said corridor-forming projectors to adjust their beams according to ground visibility, and means for adjusting said outer projectors to adjust their beams according to ceiling.

24. An approach system for guiding an aircraft pilot toward a landing runway during landing of the aircraft especially under adverse weather conditions, comprising a pair of rows of light projectors arranged to form an approach corridor aligned with and leading to said runway, said projectors having such spacing and such light distribution that a plurality of the projectors of each row are visible with substantially equal intensity from any point in a vertical plane midway between said rows, outer rows of light projectors parallel to the corridor-forming rows on the opposite sides of the corridor and adapted to lead the pilot into said corridor, said outer projectors having such spacing and such vertical distribution of light that a plurality of said projectors are visible to a pilot approaching at a certain altitude with substantially equal intensity, means for moving said corridor-forming projectors to adjust their beams according to ground visibility, means for moving said outer projectors to adjust their beams according to ceiling, and means for controlling the brightness of the light beams of all of said projectors.

JOHN B. BARTOW.

REFERENCES CITED

The following references are of record in the file of this patent:

UNITED STATES PATENTS

| Number | Name | Date |
|---|---|---|
| 1,998,429 | Andre | Apr. 23, 1935 |
| 2,017,052 | Bartow | Oct. 15, 1935 |
| 2,122,313 | Curran | June 28, 1938 |
| 2,155,295 | Bartow | Apr. 18, 1939 |
| 2,296,936 | Logan | Sept. 16, 1942 |
| 2,350,407 | McDowell | June 6, 1944 |
| 2,386,268 | Roper | Oct. 9, 1945 |
| 2,441,877 | Flett | May 18, 1948 |

OTHER REFERENCES

Civil Aeronautics Journal, Apr. 1, 1940, pp. 109–11, 156.

A Simplified System for Landing Blind, Aero Digest of May 1933.